(12) United States Patent
Iwaki (10) Patent No.: US 6,386,150 B1
(45) Date of Patent: May 14, 2002

(54) METHOD AND DEVICE FOR CONTROLLING FLOW OF COOLING MEDIUM

(75) Inventor: Takahiro Iwaki, Tokyo (JP)

(73) Assignee: Nippon Thermostat Co., Ltd., Tokyo (JP)

(*) Notice: Subject to any disclaimer, the term of this patent is extended or adjusted under 35 U.S.C. 154(b) by 0 days.

(21) Appl. No.: 09/646,118
(22) PCT Filed: Jun. 11, 1999
(86) PCT No.: PCT/JP99/03134
§ 371 Date: Dec. 1, 2000
§ 102(e) Date: Dec. 1, 2000
(87) PCT Pub. No.: WO00/45036
PCT Pub. Date: Aug. 3, 2000

(51) Int. Cl.[7] .................................................. F01P 7/16
(52) U.S. Cl. ...................................................... 123/41.1
(58) Field of Search ........................... 123/41.1, 41.08, 123/41.44, 41.39, 41.4, 41.41, 41.05

(56) References Cited

U.S. PATENT DOCUMENTS

| | | |
|---|---|---|
| 3,168,900 A | 2/1965 | Hansen et al. |
| 4,134,543 A | 1/1979 | Duprez et al. |
| 4,245,781 A | 1/1981 | Sliger |
| 4,288,033 A | 9/1981 | Wisyanski |
| 4,344,564 A | 8/1982 | Magnuson |
| 4,425,877 A | 1/1984 | Fritzenwenger et al. |
| 4,511,808 A | 4/1985 | Jost |
| 4,519,742 A | 5/1985 | Van Butyene |
| 4,598,210 A | 7/1986 | Biscomb |
| 4,605,036 A | 8/1986 | Smith et al. |
| 4,669,988 A * | 6/1987 | Breckenfeld et al. ..... 123/41.13 |
| 4,722,665 A | 2/1988 | Tyson |
| 4,843,249 A | 6/1989 | Bussiere |
| 4,849,647 A | 7/1989 | McKenzie |
| 5,040,948 A | 8/1991 | Harburg |
| 5,123,591 A | 6/1992 | Reynolds |
| 5,292,064 A | 3/1994 | Saur et al. |
| 5,324,988 A | 6/1994 | Newman |
| 5,471,098 A | 11/1995 | Asay |
| 5,791,557 A | 8/1998 | Kunze |
| 5,881,757 A | 3/1999 | Kuster et al. |
| 5,979,778 A | 11/1999 | Saur |
| 6,073,647 A | 6/2000 | Cook et al. |

FOREIGN PATENT DOCUMENTS

| | | |
|---|---|---|
| JP | 53-76428 | 7/1978 |
| JP | 3-23265 | 3/1991 |
| JP | 5-195773 | 8/1993 |
| JP | 7-279666 | 10/1995 |

* cited by examiner

Primary Examiner—Henry C. Yuen
Assistant Examiner—Hyder Ali
(74) Attorney, Agent, or Firm—Oblon, Spivak, McClelland, Maier & Neustadt, P.C.

(57) ABSTRACT

A flow control process for controlling a cooling fluid flowing through a cooling fluid channel of an internal combustion engine. The process moves a valve element forward or backward in the manner of crossing the cooling fluid channel according to a temperature change of the cooling fluid so as to communicate or block the cooling fluid channel.

13 Claims, 7 Drawing Sheets

METHOD AND DEVICE FOR CONTROLLING FLOW OF COOLING MEDIUM

FIELD OF THE INVENTION

The present invention relates to a process for controlling a flow amount of cooling fluid flowing through the internal combustion engine and an apparatus thereof.

DISCUSSION OF THE BACKGROUND

At present, as commercially available cooling systems for engines, most of the systems are types, which cool the engines by water-cooling. The water-cooled system prevents overheating due to the heating of the engine and prevents overcooling of the engine in cold times, always keeping the engine at an optimal temperature In the cooling system by water-cooling, a radiator is placed outside of an engine, and the radiator and the engine are connected by means of a rubber hose, etc. to circulate a cooling fluid. The main configuration of the water-cooled system is composed of the radiator, which plays a role as a heat exchanger, a water pump, which forcedly feeds the cooling fluid from the engine to the radiator, a thermostat, which controls the flow of the cooling fluid to or from the radiator depending upon a change in the temperature of the cooling fluid to keep the temperature of the cooling fluid at an optimal level, and a rubber hose, which forms a circulation channel for the cooling fluid, and the like. Such a water-cooled system for cooling an engine is utilized in an engine for a two-wheeled vehicle as well as an engine for four-wheeled vehicle.

In recent vehicles, the weight is attached to the design for the outward appearance and, thus, it is required for the apparatuses to be placed within the engine room to improve the design of the apparatuses making it possible to effective layout within the engine room. For example, with regard to the radiator, there is a down-flow type radiator having an upper tank and a lower tank placed therein which carries out the heat exchange by circulating the cooling fluid. Due the configuration where the flow of the cooling fluid in the vertical direction, the down-flow type radiator is not suitable to be fit to a vehicle having a low hood. In the case of the vehicle having a low hood, a cross flow type radiator is utilized in which the cooling fluid flows in the horizontal direction. The cross flow type radiator can adjust the height and, thus can be adapted to the design of the vehicle having a low hood.

Figure 6A:
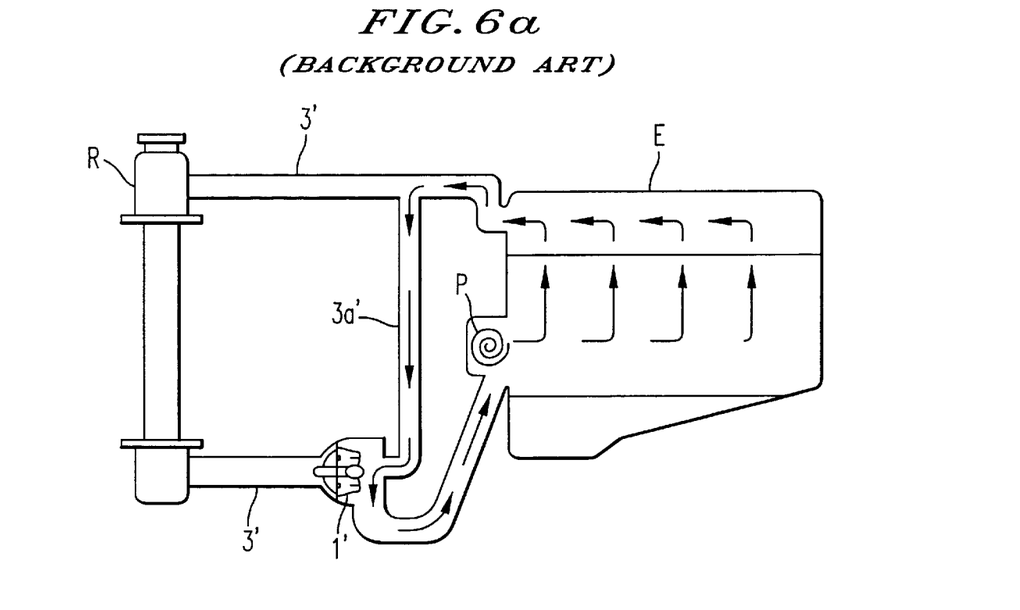
FIG. 6 is an explanatory drawing of a cooling fluid channel of a general engine.
Figure 6B:
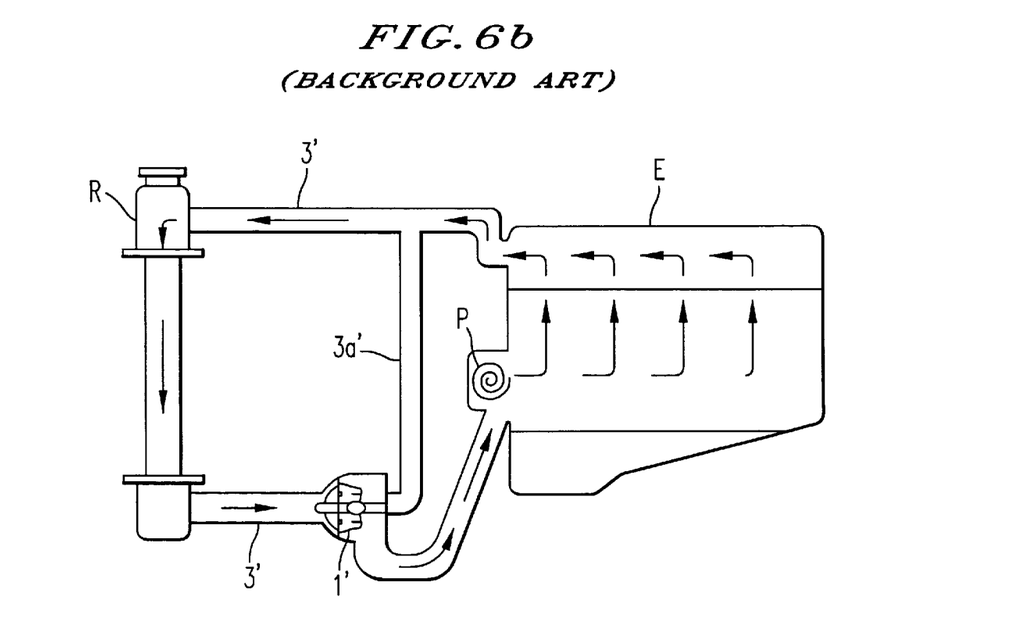

As described above, the thermostat for controlling the flow of the cooling fluid is placed within the four-wheeled vehicle having the water-cooled engine. As shown in FIG. 6, a thermostat 1' which is utilized in a general vehicle is placed on an appropriate portion of a cooling fluid channel 3' formed between the body of an engine E and a radiator R. The thermostat 1' itself is accommodated within a case or such. As a mechanism for quickly increasing the temperature of the cooling fluid to the optimum temperature at the time of starting the engine, some of the thermostats have a configuration to place a bypass channel 3A' on a cooling fluid channel 3'. Many thermostats 1' have been developed having a bypass valve construction accommodated within the thermostat 1' in order to bypass the cooling fluid to the bypass channel 3A'.

Depending upon the design of the vehicle, there is a vehicle having an extremely small space within the engine room. In the case of such a vehicle, the piping positions of the cooling fluid channel 3' and the bypass channel 3A' are regulated, and the position of the thermostat 1' accommodated within the case or such to be placed is also regulated.

With regard to the two-wheeled vehicle having the water-cooled engine carried therein, the space is further smaller, and the positions of the piping of the cooling fluid channel 3', the bypass channel 3A', and the thermostat 1' are also regulated similar to or much more than the case of the four-wheeled vehicle.

Figure 7:
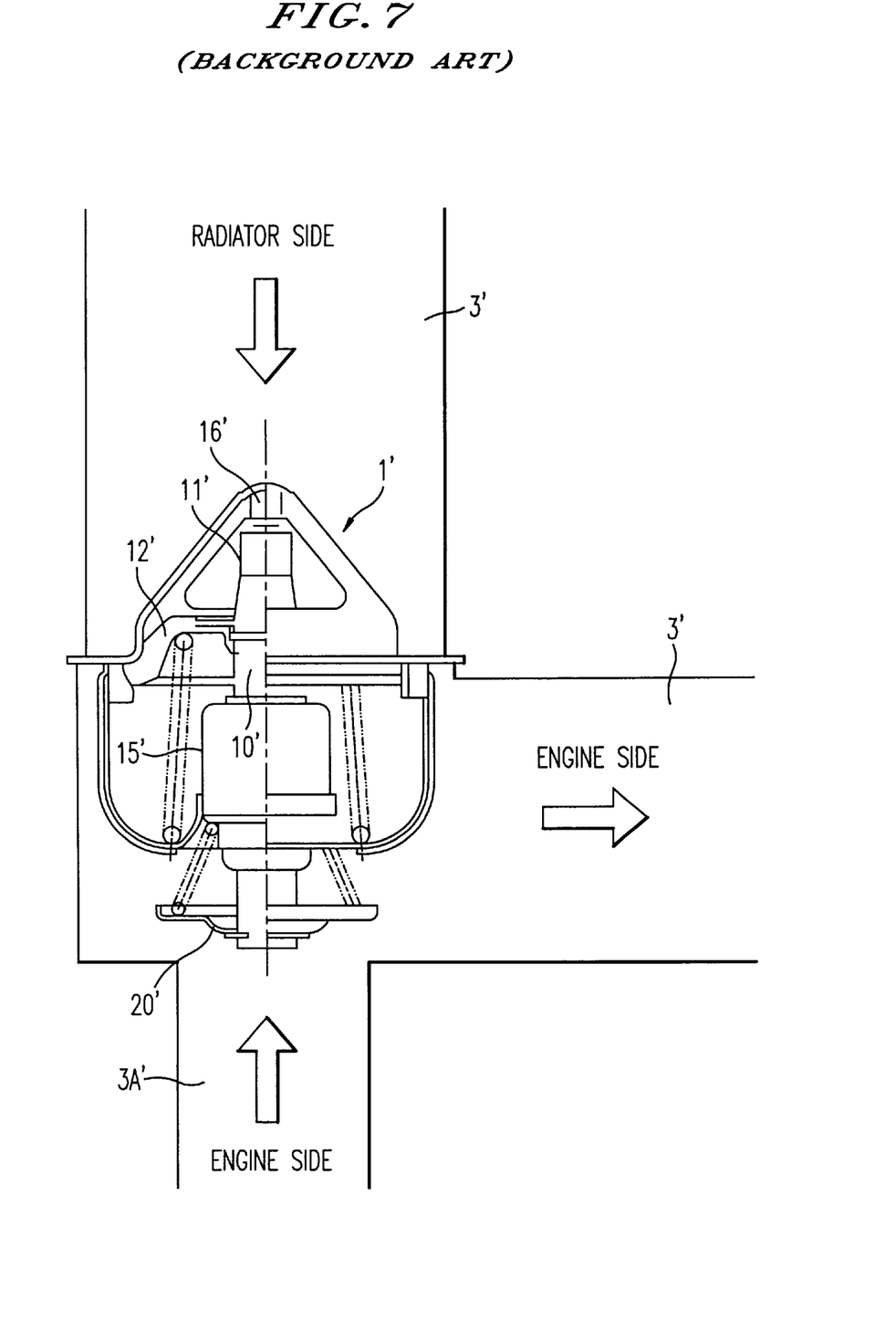
FIG. 7 is a partially cross-sectional view of the thermostat of FIG. 6.

As shown in FIG. 7, the conventional thermostat 1' is placed within the cooling fluid 3' and a piston 16' is moved forward and backward in the direction parallel to the flow of the cooling fluid to open or close a thermo-valve 12'. The flow amount of the cooling fluid flowing at the position where the thermostat 1' is placed should be secured to be approximately the same degree as the flow amount of the cooling fluid flowing within another portions. For this reason, it is required to secure a capacity for the flow of the cooling fluid at a lower portion of the thermo-valve 12' (around the wax case 15'). Specifically, the pipe diameter (cross section) of the cooling fluid channel 3' at the portion on which the thermostat 1' is placed should be larger than the pipe diameter (cross section) of the cooling fluid channel 3' at any other portion.

In the thermostat 1' shown in FIG. 7, since the wax case 15', which detects the change in the temperature, is in the state of being directly immersed in the cooling fluid, it sensitively responds to the change in the temperature of the cooling fluid. For this reason, when the temperature of the cooling fluid is not uniform, for example, in the case of the warm-up of the engine at a cold morning, the thermo-valve 12' is frequently opened or closed to sometimes cause a hunting phenomenon. If the hunting phenomenon is caused, the flow amount of the cooling fluid cannot be controlled in a stable manner, and the temperature of the engine E cannot be held at the optimal temperature. As a result, the fuel ratio is changed for the worse and a large amount of harmful exhaust gas is discharged.

SUMMARY OF THE INVENTION

An object of the present invention is to provide a process for controlling a flow of a cooling fluid, which can secure an adequate flow amount of the cooling fluid without changing the pipe diameter of the existing cooling fluid channel, and which can prevent the worsening of the fuel ratio and the discharge of the harmful exhaust gas due to the hunting phenomenon, and an apparatus thereof A flow control process for controlling a cooling fluid according to the present invention, which can attain the object described above, is a process for controlling a cooling fluid flowing through a cooling fluid channel of an internal combustion engine, which comprises, moving an valve element forward or backward in the manner of crossing the cooling fluid channel according to a change in the temperature of the cooling fluid so as to communicate or block the cooling fluid channel.

In the flow control process for controlling a cooling fluid, since the valve element is moved forward or backward in the manner of crossing the cooling fluid channel, the flow amount of the cooling fluid can be secured without changing the pipe diameter of the cooling fluid channel and the device can be fit to a voluntary portion of the cooling fluid channel.

The flow controller according to the present invention, which attains the object is placed within a cooling fluid channel of an internal combustion engine and controls a flow of a cooling fluid flowing through the cooling fluid channel depending upon the change in the temperature of the cooling fluid and comprises: a cylindrical valve body which has an inlet opening and an outlet opening formed on a circumference thereof and which is fixed on the position where said inlet opening and said outlet opening are communicated with said cooling fluid channel; a fluid channel area which communicates said inlet opening and said outlet opening within said valve body, and a valve element which moves forward and backward in the manner of crossing said channel area depending upon the change in the temperature of said cooling fluid, whereby said inlet opening and said outlet opening are opened or closed through the movement of said valve element to communicate or block said fluid channel area, According to the flow controller for controlling a cooling fluid, since the valve element is configured so as to move forward or backward in the manner of crossing the fluid channel area, the flow amount of the cooling fluid can be secured without changing the pipe diameter of the cooling fluid channel and the controller can be fit to a voluntary portion of the cooling fluid channel.

In the flow controller of the cooling fluid described above, said valve element moves forward or backward due to the expansion/shrinkage of a thermal expanding element, and the change in the temperature of the cooling fluid is transmitted to said thermo-sensitive portion via the valve element.

Since the change in the temperature is transmitted to the thermosensitive portion via the valve element, the thermal expanding element within the thermo-sensitive portion responds to the change in the temperature of the cooling fluid in a mild manner, which prevents the hunting phenomenon.

Furthermore, in the flow controller of the cooling fluid described above, a joint cover for fixing said valve body is unified with said valve body.

The unification of the valve body with the joint cover makes it easy to place the flow controller of the cooling fluid within the cooling fluid channel.

Moreover, in the flow controller of the cooling fluid described above, a bypass opening is formed on the circumference of said valve body, and said bypass opening and a bypass channel are communicated or blocked due to the movement of the valve element.

In this embodiment, due to the movement of the valve element, the main channel of the cooling fluid channel is communicated or blocked, and the bypass opening and a bypass channel are communicated or blocked.

For this reason, the cooling fluid can be controlled by a bypass channel only by a very simple structure.

DESCRIPTION OF THE PREFERRED EMBODIMENTS

Figure 1:
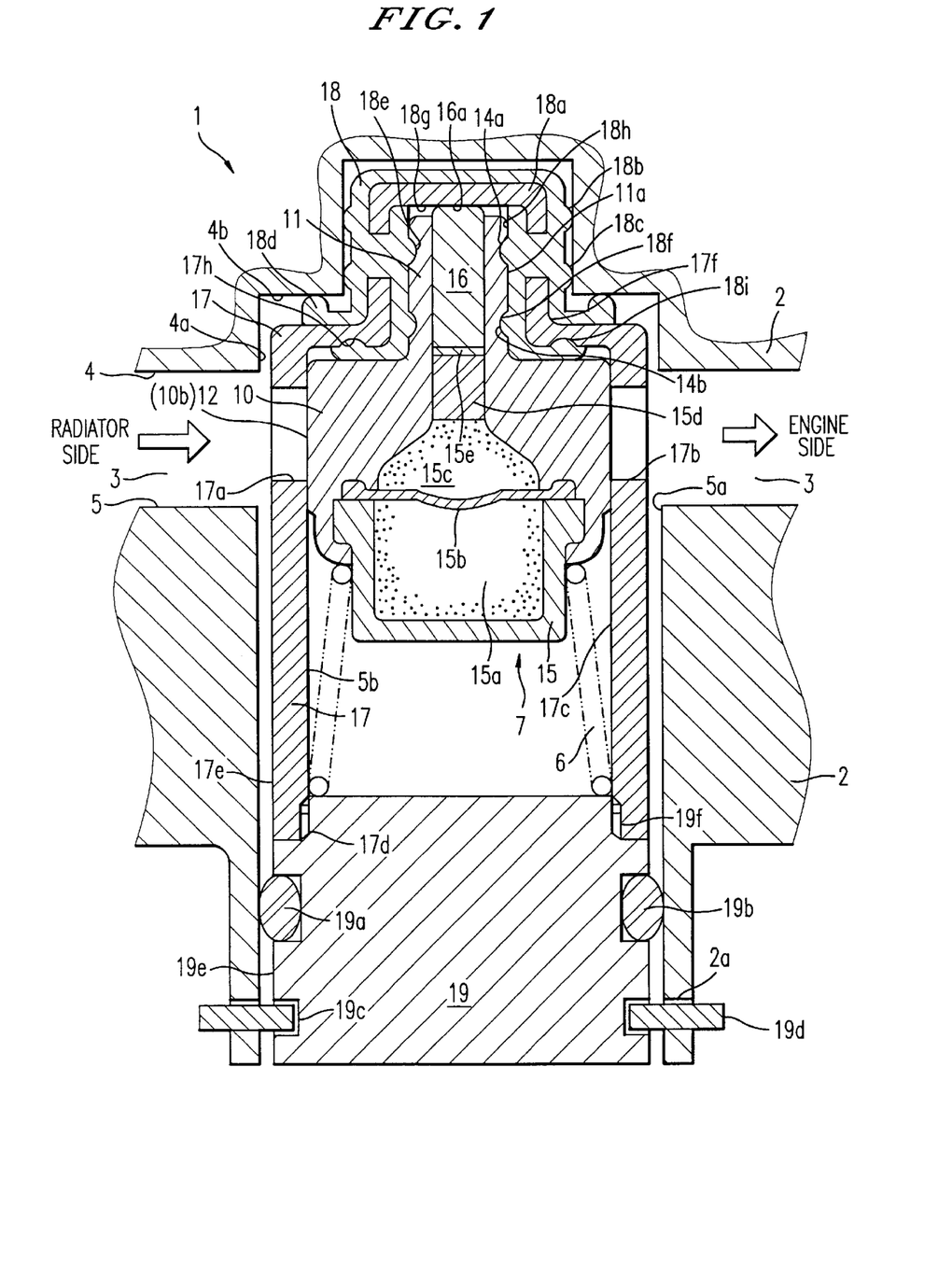
FIG. 1 is a cross-sectional view of a thermostat according to the first embodiment of the present invention showing the situation of opening the valve.
Figure 2:
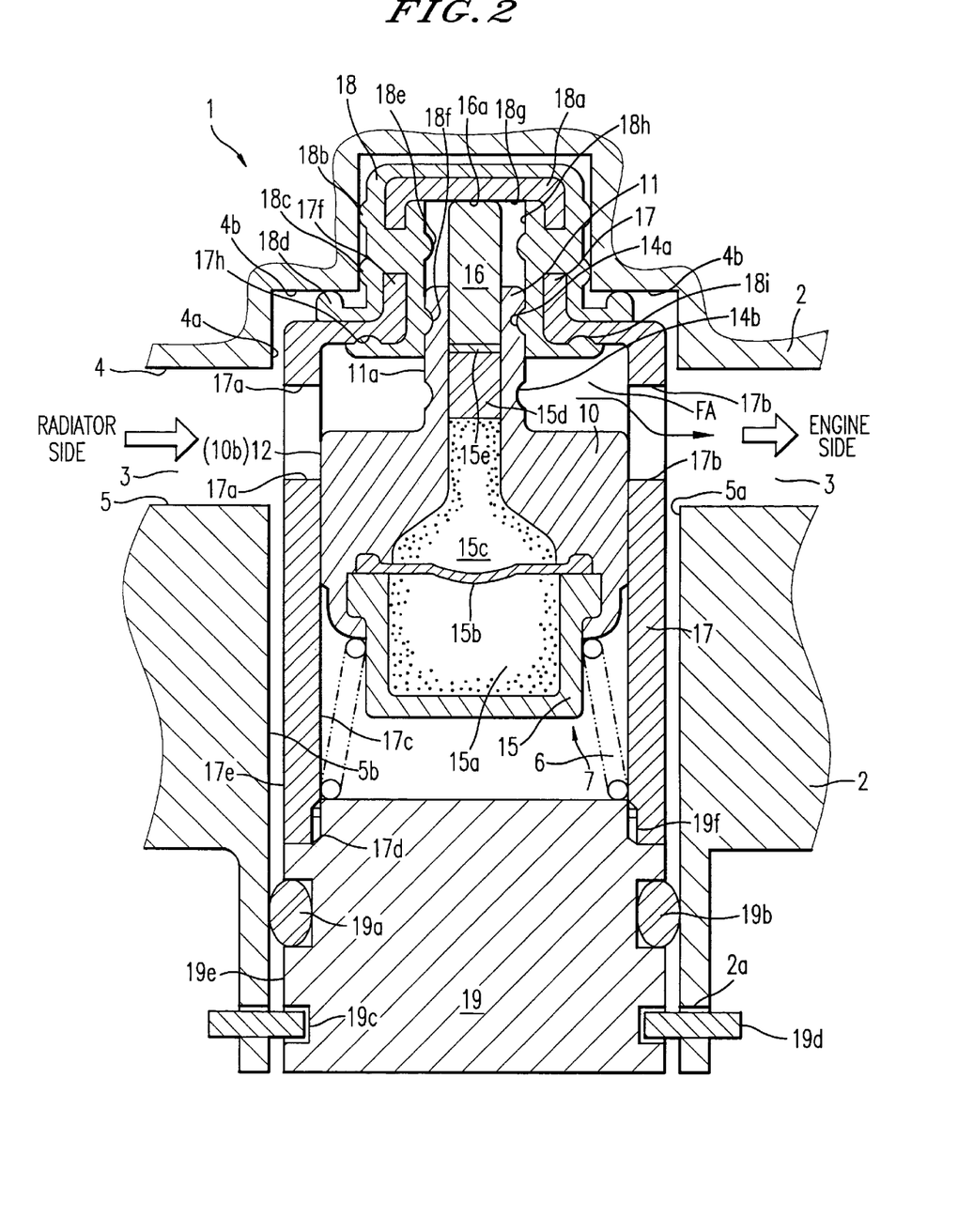
FIG. 2 is a cross-sectional view of a thermostat according to the first embodiment of the present invention showing the situation of closing the valve.
Figure 3:
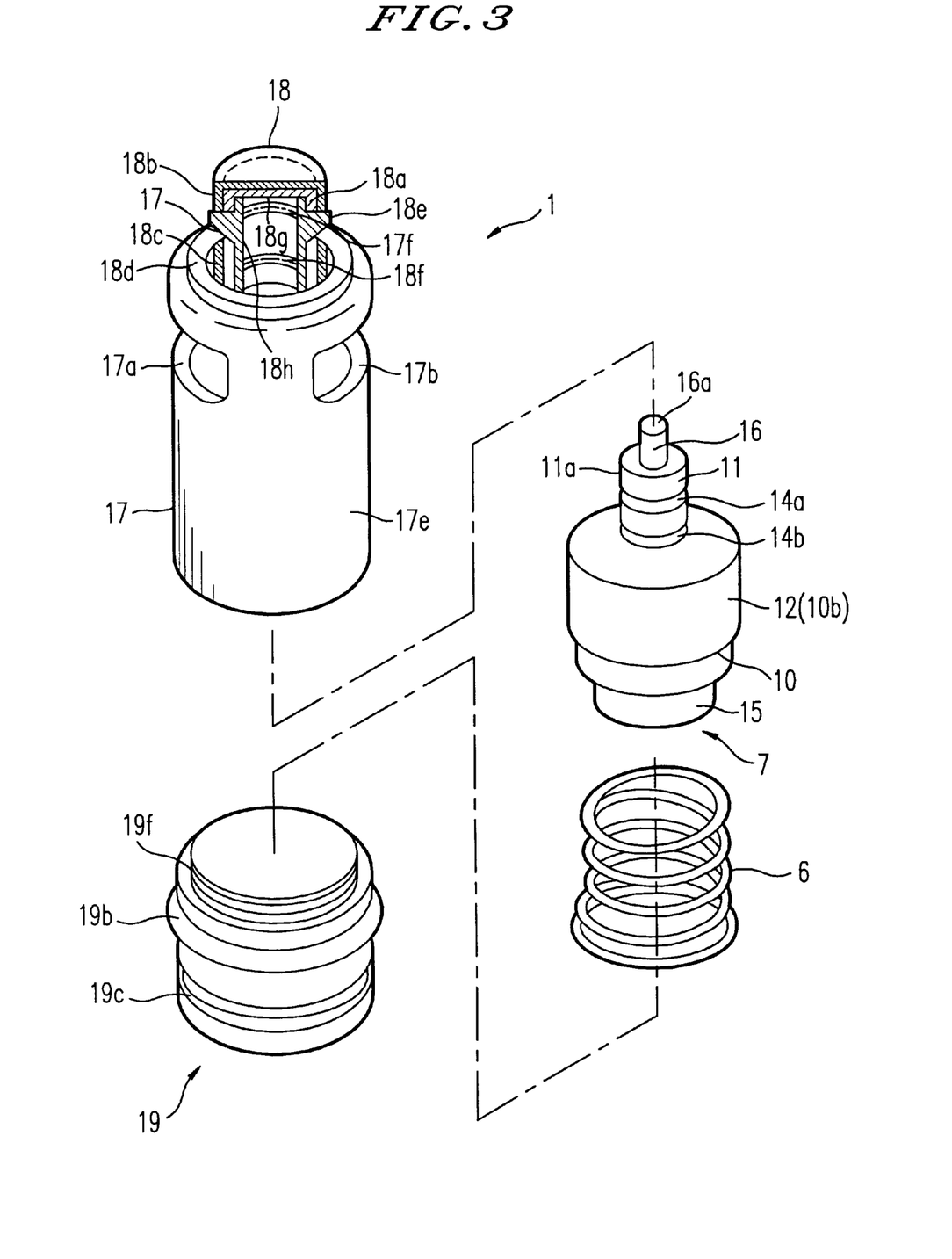
FIG. 3 is an exploded perspective view of the main portions of the thermostat according to a first embodiment of the present invention.

A flow control process of a cooling fluid and an apparatus for the same according to the first embodiment of the present invention will now be described by referring to FIGS. 1 to 3. FIG. 1 is a cross-sectional view of a thermostat according to the first embodiment of the present invention showing the situation of opening the valve, FIG. 2 is a cross-sectional view of a thermostat according to the first embodiment of the present invention showing the situation of closing the valve, and FIG. 3 is an exploded perspective view of the main portions of the thermostat according to a first embodiment of the present invention.

In the first embodiment, the flow controller of the cooling fluid is applied to a thermostat provided on a water-cooled system for a vehicle engine to be explained. The controlling process will be also described on the basis of the function of the thermostat. In this embodiment, cooling water flowing through the cooling fluid channel of the water-cooled system is utilized as the cooling fluid.

In the flowing description, the embodiment will now be described where the thermostat is placed within the cooling fluid channel of the engine head.

The position of the thermostat to be placed is not restricted to the engine head and the thermostat may be fit to any portion within the cooling fluid channel. For example, the same functions and the same effects will be obtained, if the thermostat is fit to the portion of the engine block, the interior of the radiator, or a branched portion of the bypass channel, or the like.

A thermostat 1 is embedded into the upper insert hole 4a, positioned at an upper surface 4 of the cooling fluid channel 3 and the lower insert hole 5a, positioned at a lower surface 5 of the cooling fluid channel 3 in the manner of crossing a cooling fluid channel 3 of an engine head 2. The thermostat 1 thus placed controls the flow amount of the cooling fluid within the cooling fluid channel 3 depending upon a change in the temperature of the cooling fluid flowing through the cooling fluid channel 3 due to the forward or backward movement of a valve element 12 crossing the cooling fluid channel 3 to communicate or block the cooling fluid channel 3.

The thermostat 1 is mainly composed of a hollow and cylindrical valve body 17, and a thermo-valve 7 which is stored in the hollow portion of the valve body 17 in a slidable manner, a cap member 18 which is inserted into one end of the valve body 17, a joint cover 19 which is inserted into the other end of the valve body 17, and a coil spring serving as a spring member for the thermo valve 7. The thermo valve 7 is mainly composed of an element 10 which is composed of a valve element 12 for communicating and blocking the flow of the cooling fluid and a guide portion 11 for guiding the movement of the element 10, a wax case 15 placed on the bottom of the element 10, a wax 15a stored in the wax case 15, a piston 16, and the like.

Parts making up the thermostat 1 will now be described.

(1) Valve Body 17:

As shown in FIGS. 1 to 3, the valve body has such an outer circumference diameter as to be inserted into a stepped wall 4b of a perforated pore 4a formed on the upper surface 4 of the cooling fluid channel 3 of the engine head 2, and to be inserted into an inner wall 5b of a perforated pore 5a formed on the lower surface 5, and is a hollow cylindrical form, both ends of which are opened. On a circumference surface 17e of the valve body 17, an inlet opening 17a for the cooling fluid is formed and perforated opposite an outlet opening 17b. By means of the inlet opening 17a, the outlet opening 17b and the element 10 (valve element 12), a fluid channel area FA (see FIG. 2) of the cooling fluid channel 3 is formed within the thermostat 1 and the main channel (fluid channel of the cooling fluid from the radiator side to the engine side) is communicated or blocked. When the element 10 (valve element 12) descends in a slidable manner, the inlet opening 17a and the outlet opening 17b are opened to communicate the fluid channel FA, whereby the cooling fluid flows from the radiator side to the engine side (see FIG. 2). On the other hand, when the thermostat 1 ascends in a slidable manner, the inlet opening 17a and the outlet opening 17b are closed to block the fluid channel area FA, whereby the cooling fluid flowing from the radiator side to the engine side is blocked (see FIG. 1). The term "fluid channel area FA" used herein means a fluid channel of the cooling fluid which is communicated within the valve body 17 by opening the inlet opening 17a and the outlet opening 17b when the element 10 (valve element 12) descends in a slidable manner. When the thermostat 1 is fit to the engine head 2, the valve body 17 is fixed at the position where the inlet opening 17a and the outlet opening 17b, are opened toward the cooling fluid channel 3 (the position where they are communicated with the cooling fluid channel 3, respectively). The open area of the inlet opening 17a and the open area of the outlet opening 17b are required to be capable of securing a sufficient amount of the cooling fluid flowing through the cooling fluid channel 3.

The end circumference 17f of the valve body 17 is formed so as to be engaged with the shape of the stepped wall 4b of the perforated pore 4a, and a cap member 18, which is described later on, is fixed and unified by baking or a similar treatment (see FIG. 2).

A screw portion 17d is placed on one end of an inner wall 17c of the valve body 17 so as to be screwed with a screw portion 19f of the joint cover 19. By screwing the screw portion 17d of the valve body 17 with the screw portion 19f of the joint cover 19, the set length of the valve body 17 and the joint cover 19 can be adjusted and the valve body 17 and the joint cover 19 can be unified with each other, which makes it easy to place the valve body 17 and the joint cover 19 on the engine head 2.

(2) Thermo Valve 7:

As shown in FIGS. 1 to 3, the thermo valve 7 is inserted into the valve body 17 in the manner of coming into slidably contact with an inner wall 17c of the valve body 17. The thermo valve 7 is mainly composed of a wax case 15 for storing a wax 15a serving as a thermal expansion element, a diaphragm 15b which transmits the expansion or shrinkage of the wax 15a to a semi-fluid 15c of an upper layer, the semi-fluid 15c which transmits the follow-up movement of the diaphragm 15b to a rubber piston 15d of an upper layer, the rubber piston 15d, a backup plate 15e which transmits the follow-up movement of the semi-fluid to the piston 16 of an upper layer, the piston 16, which pushes a metal fitting 18a of the cap member 18, and the element 10 which accumulates these configuration to parts in a layered state.

An outer circumference 10b of the element 10 which can slide in the inner wall 17c of the valve body 17 has a cylindrical form and possesses a function of the valve element 12 which opens or closes the inlet opening 17a and the outlet opening 17b by the movement in a slidable manner.

In the valve element 12 (element 10), the piston 16 moves forward or backward due to the expansion or shrinkage of the wax 15a within the wax case 15 to slide within the valve body 17, to thereby open or close the inlet opening 17a and the outlet opening 17b. By opening the inlet opening 17a and the outlet opening 17b, a fluid channel area FA is communicated, while by closing the inlet opening 17a and the outlet opening 17b, a fluid channel area FA is blocked.

The wax case 15 for storing the wax 15a is fixed at the bottom of the element 10, for example, by means of calking. The wax case 15 is fixed on the bottom of the interior of the element 10 (valve element 12), and is not directly immersed with the cooling fluid. Consequently, the change in the temperature of the cooling fluid is transmitted to the wax case 15 via the element 10 (valve element 12). Since the wax case 15 is never directly immersed with the cooling fluid, the sensitivity of the wax case to the temperature is mild and, thus, the expansion or shrinkage of the wax 15a also becomes mild.

At the side of the element 10 opposite the wax case 15, the guide portion 11 serving as a guide for the piston 16 is formed. An outer circumference 11a of the guide portion 11 is formed into a shape so as to slide in the inner wall surface 18h of the cap member 18.

Circular grooves 14a and 14b are caved onto the outer circumference 11a of the guide portion 11 along the circumference surface. The circular grooves 14a and 14b engage with a plurality of lip portions 18e and 18f projecting on the inner wall surface 18h of the cap member 18, resulting in the cap member 18 becoming held in a much more secure manner. The engagement also prevents the penetration of the cooling fluid into the gap formed between the guide portion 11 and the piston 16, Furthermore, since the cap member 18 holds the outer circumference 11a of the guide portion 11, it becomes possible to prevent from the slanting of the guide portion 11 which moves according to the movement of the piston 16.

The thermo valve 7 transmits the change in the temperature of the cooling fluid within the cooling fluid channel 3 to the wax 15a within the wax case 15 via the valve element 12 of the element 10. Then, the wax 15a expands or shrinks whereby the piston 16 expands or contracts. What is more, a contact portion 16a which is a tip portion of the piston 16 is always in contact with a contact surface 18a of a metal fitting 18. Consequently, due to the expansion or contract of the piston 16, the element 10 is pushed down or pushed up.

(3) Cap Member 18:

As shown in FIGS. 1 to 3, the cap member 18 is in a hat form and is formed so that the convex portion of the cap member 18 is inserted into and engaged with an insert hole 4a of the engine head 2. The cap member 18 is unified with the valve body 17 in the form that the cap member 18 includes the end circumference surface 17f of the valve body 17 by means of baking or the like.

Lip portions 18b, 18c and 18d project onto the cap member 18 for the purpose of the prevention of the immersion of the cooling fluid into the engine head 2.

Lip portions 18e and 18f, which are engaged with circular grooves 14a and 14b of the guide portion 14, project on an inner wall 18h of the cap member 18. The engagement of the lip portions 18e and 18f with the circular grooves 14a and 14b prevents the immersion of the cooling fluid into a gap formed between the guide portion 11 and the piston 14. Also, the engagement of circular grooves 14a and 14b with the lip portions 18e and 18f prevents the slanting of the element 10 toward the shaft direction of the piston 16, when the element 10 slides. With regard to the lip portions 18b, 18c, 18d, 18e, and 18*f* of the cap member 18, the number of the lip portions formed and the distance between the lip portions can be freely designed depending upon the conditions of the expansion and contract and lift of the piston 16 of the thermo valve 7.

The cap member 18 are unified and fixed, for example, by baking, and the penetration of the cooling fluid and dust can be prevented due to the engagement of the circular groove 17 placed on the surface of the valve body 17 in contact with the cap member 18 with the lip portion 18*i* placed on the surface of the cap member 18 in contact with the valve body 17.

The material making up the cap member 18 is not particularly restricted as long as it excels in the physical and mechanical properties such as heat resistance, wear and abrasion resistance, and vibration proof. For example, an elastic member such as rubber has these properties. If the cap member 18 is made up from the material having heat resistance, the cap member also possesses a thermal insulation function which prevents the direct transmission of the heat generated from the engine to the piston 16

(4) Joint Cover 19:

As shown in FIGS. 1 to 3, the joint cover 19 ha a substantially cylindrical form and a screw portion 19*f* which is screwed with the screw portion 17*d* placed on the end opposite the end circumference 17*f* of the valve body 17 is formed on a portion of the outer circumference of the joint cover 19. By screwing the screw portion 19*f* with the screw portion 17*f*, the joint cover 19 is unified with the valve body 17.

A groove 19*a* for fastening a seal ring 9*b* is formed on the outer circumference 19*e* of the joint cover 19 Also, a clip groove 17*c* which fastens a clip 19*d* for fixing the thermostat 1 onto the engine head 2 is formed on the outer circumference 19*e* of the joint cover 19. By means of the seal ring 19*b*, a gap between an inner wall 5*b* of a perforated pore 5*a* and a circumference surface 17*e* of the valve body 17 is in a watertight state, and prevents the penetration of the cooling fluid into the engine block.

By adjusting the conditions of the screwing between the screw portion 17*d* and the screw portion 19*f*, the resilient force of the coil spring 6, which is the spring member of the thermo valve 7 can be increased or decreased to adjust the state of opening the valve element 12. This makes it possible to adjust the flow amount of the cooling fluid.

It should be noted that the method of connecting the valve body 17 to the joint cover 19 in the present invention is not restricted to the screwing between the screw portion 17*d* and the screw portion 19*f*, and the similar functions and the similar effects can be obtained if fastener such as a C ring is used.

(5) Coil Spring 6 (Spring Member)

As shown in FIGS. 1 to 3, the coil spring 6 serving as a spring member for the thermo valve 7 is inserted in a gap between the joint cover 19 and the thermo valve 7. When the thermo valve 7 descends in a slidable manner within the valve body 17 due to the change in the temperature of the cooling fluid, the coil spring 6 applies the resilient force to the thermo valve 7 in the upper direction.

Changing the total height of the coil spring 6 makes it possible to apply changes in the conditions, such as the set actuation temperature of the thermostat 1, the flow amount, etc.

Next, the fitting of the thermostat 1 to the engine head 2 will be described.

The thermostat 1 is fit to the engine head 2 in the state where the thermostat 1 is unified with the valve body 17 and the joint cover 19 with due to the screwing. First, the thermostat 1 is inserted in the engine head 2 at the position where the inlet opening 17*a* and the outlet opening 17*b* of the valve body 17 are opened toward the cooling fluid channel 3. Then, the clip 19*d* is inserted from an engagement groove 2*a* of the engine head 2 to engage the clip 19*d* with the clip groove 19*c* of the joint cover 19. This engagement of the clip 19*d* with the clip groove 19*c* regulates the movement of the thermostat 1 in the slide direction (the direction of moving the piston 16). Unification of the valve body 17 with the joint cover 19 simplifies the fitting and detaching the thermostat 1 and decreases the man-hour.

As described above, the thermostat 1 is arranged in such a manner that the piston 16 (valve element 12) moves in the direction across the fluid channel 3 to the flow direction of the cooling fluid (vertical direction to the flow direction). For this reason, a sufficient flow amount of the cooling fluid can be secured without enlarging the pipe diameter of the cooling fluid channel 3.

Due to the lip portions 18*b*, 18*c*, and 18*d* of the cap member 18, and the seal ring 19*b* of the joint cover 19, the thermostat 1 possesses the functions of shielding the cooling fluid to the engine and of insulating the vibration.

With reference to FIGS. 1 and 2, the function of the thermostat will be described, which explains the process for controlling the cooling fluid.

(1) Functions of Thermostat 1 from Closed State to Opened State

The cooling fluid within the cooling fluid channel 3 before warming up has a low temperature. At this time, the wax 15*a* within the wax case 15 is in the shrunken state, and a resilient force in the upper direction is always applied to the thermo valve 7 by means of the coil spring 6. For this reason, the valve element 12 of the element 10 maintains the state of closing the inlet opening 17*a* and the outlet opening 17*b* of the valve body 17. To be specific, the fluid channel area FA is blocked and, thus, the cooling fluid never flows from the radiator side to the engine side.

The temperature of the engine is increased with the elapse of time, and the temperature of the cooling fluid within the cooling fluid channel 3 is also increased, Then, the increased temperature is transmitted to the wax 15*a* within the wax case 15 via the element 12, and the wax 15*a* within the wax case 15 swells to increase its volume. Due to the increase in the volume of the wax 15*a*, the diaphragm 15*b* swells upward. This gives the force of pushing the rubber piston 15*d* upward via the upper semi-fluid 15*c*. This force is transmitted to the piston 16 via the backup plate 15*e*, whereby the piston 16 will project out of the guide portion 11. However, since the contact portion 16*a* which is the edge of the piston 16 is always in contact with the contact surface 18 of the metal fitting 18*a* of the cap member 18, which has been fixed, the element 10 itself is pushed down due to the relative movement to the piston 16 (see FIG. 2).

However, since the contact portion 16*a* which is a tip portion of the piston 16 is always in contact with a contact surface 18*a* of a metal fitting 18, the guide portion 11 and the element 10 (valve element 12) actually descend.

At this time, the circular groove 14*a* of the guide portion 11 which is engaged with the lip portion 18*e* of the cap member 18 (see FIG. 1) descends along the inner wall surface 18*h* of the cap member 18 and is finally engaged with the lip portion 18*f* of the cap member 18 (see FIG. 2). The position of the lip portion 18*f* formed by the projection is an approximate position for determining the final descending position of the element 10. On the way from the lip portion 18*e* to the lip portion 18*f*, another lip portion may be formed to enhance preventing the cooling fluid from penetrating into the gap portion between the guide portion 11 and the piston 16.

The coil spring 6 for the purpose of always applying the resilient force to the thermo valve 7 upwardly is placed on the gap between the thermo valve 7 and the joint cover 19 and, thus, the thermo valve 7 descends in a slidable manner against the resilient force of the coil spring 6.

When the thermo valve 7 descends, the inlet opening 17*a* and the outlet opening 17*b* of the valve body 17, which have been in the closed state, are opened by the valve element 12 of the element 12 to be communicated with the fluid channel area FA. As a result, the cooling fluid flows from the radiator side to the engine side (see the belt arrow of FIG. 2). Then, the cooling fluid which has been cooled in the radiator passes through the cooling fluid channel 3 and flows into the engine. At this time, since the change in the temperature of the cooling fluid is transmitted via the element 10 of the valve element 12 to the wax case 15, which is a temperature sensitive portion, the cooling fluid, which has cooled in the radiator side, never suddenly shrinks the wax 15*a*.

(2) Functions of Thermostat 1 from Opened State to Closed State

When the engine is stopped, the actuation of the water pump is also stopped and the circulation of the cooling fluid within the cooling fluid channel 3 is stopped as well. The temperature of the cooling fluid within the cooling fluid channel 3 is decreased with the elapse of time. According to the temperature change, the wax 15*a*, which has been expanded is shrunken. Since the change in the temperature of the cooling fluid flowing from the radiator side is transmitted to the wax case 15, which is a temperature sensitive portion, via the valve element 12 of the element 10, the wax 15*a* is mildly shrunken. This causes the thermo valve 7 to slide upward by means of the resilient force of the coil spring 6 which always applies the upward resilient force to the thermo valve 7. As a result, the outer circumference 12 of the element 10 finally closes the inlet opening 17*a* and the outlet opening 17*b* of the valve body 17 to block the fluid channel area FA (see FIG. 1).

Since the temperature change of the cooling fluid is transmitted via the element 10 of the valve element 12 to the wax case 15, which is a temperature sensitive portion, the volume change in the wax 15*a* becomes milder. As a result, it becomes difficult to cause the hunting phenomenon where the valve element 12 repeatedly opens and closes the inlet opening 17*a* and the outlet opening 17*b*.

Figure 4:
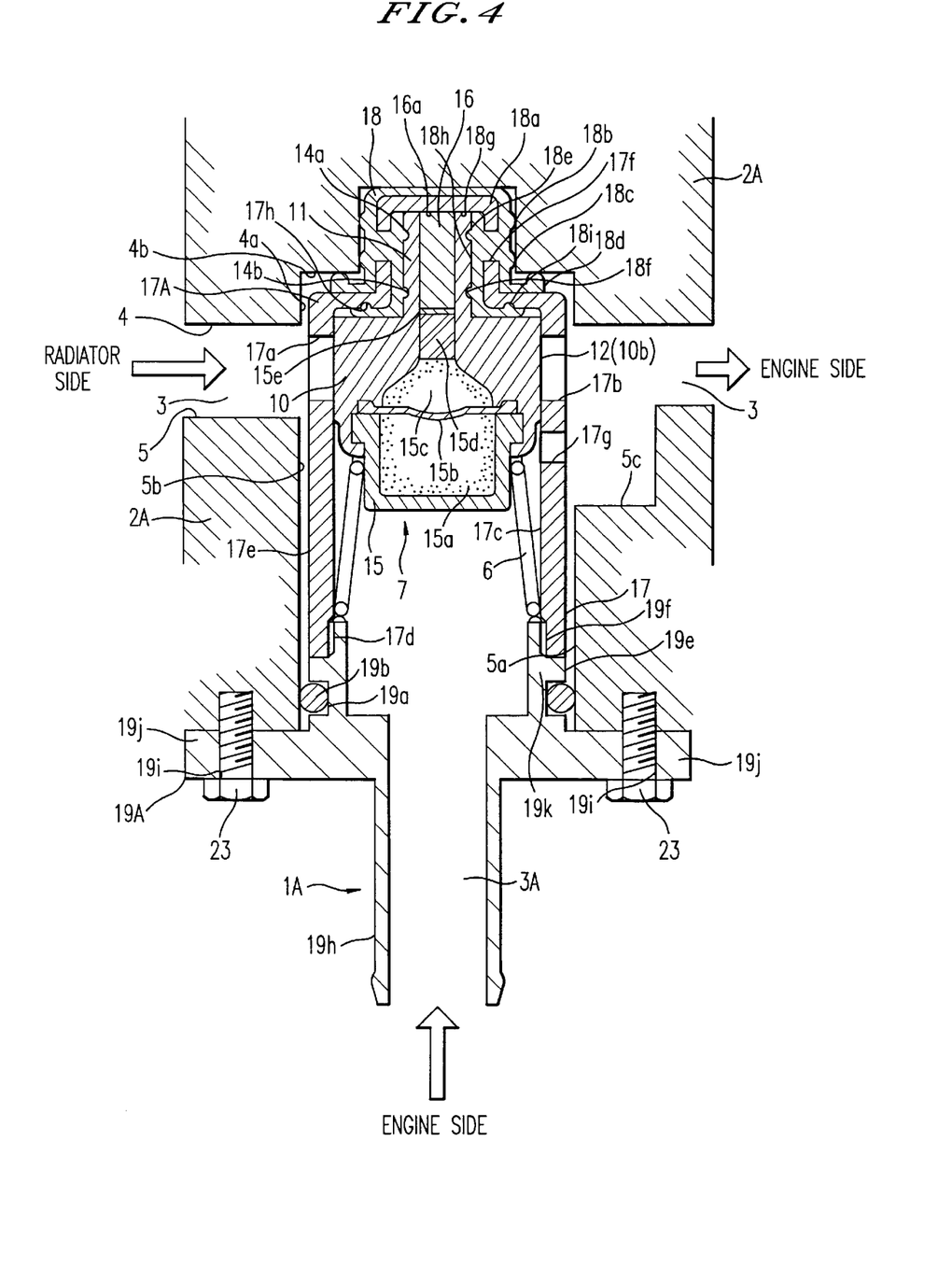
FIG. 4 is a cross-sectional view of a thermostat according to the second embodiment of the present invention showing the situation of opening the valve.
Figure 5:
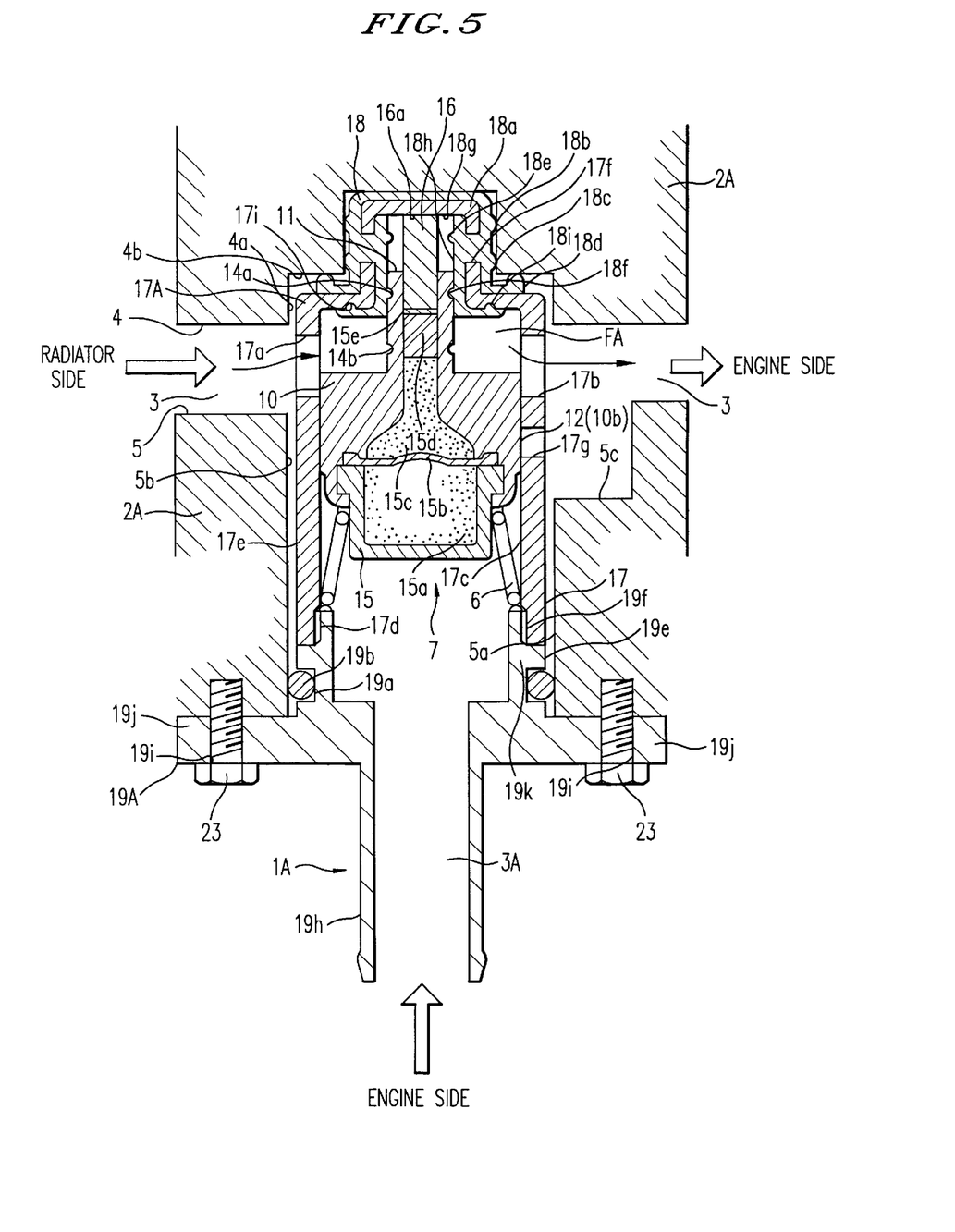
FIG. 5 is a cross-sectional view of a thermostat according to the second embodiment of the present invention showing the situation of closing the valve.

Next, the second embodiment of the thermostat according to the present invention will now be described by referring to FIGS. 4 and 5. FIG. 4 is a cross-sectional view of a thermostat according to the second embodiment of the present invention showing the situation of opening the valve, and FIG. 5 is a cross-sectional view of a thermostat according to the second embodiment of the present invention showing the situation of closing the valve.

In the second embodiment, the flow controller of the cooling fluid is applied to a thermostat provided on a water-cooled system for a vehicle engine to be explained. The controlling process will be also described on the basis of the function of the thermostat, In this embodiment, cooling water flowing through the cooling fluid channel of the water-cooled system is utilized as the cooling fluid.

In this embodiment, a thermostat 1A is applied to a cooling fluid channel 3 having a bypass channel 3A. The basic construction of the thermostat 1A is similar to that of the thermostat 1 according to the first embodiment, but the thermostat 1 A also has a construction that the cooling fluid from the bypass channel 3A flows. With regard to the parts having the same configurations and the same functions used in this embodiment, the same symbols are used.

A thermostat 1A is embedded into a perforated hole 4*a* formed on the upper surface 4 of the cooling fluid channel 3 and a perforated hole 5*a* formed on the lower surface 5 of the cooling fluid channel 3 at the position across the cooling fluid channel 3, and being communicated with a bypass channel 3A. A stepped wall 5*c* is formed on the perforated pore 5*a* for the purpose of securing the flow of the cooling fluid from a bypass opening 17*g*.

The thermostat 1A controls the flow amount of the cooling fluid within the cooling fluid channel 3 depending upon a change in the temperature of the cooling fluid flowing through the cooling fluid channel 3 due to the movement of a valve element 12 crossing the cooling fluid channel 3 to communicate or block the cooling fluid channel 3, The thermostat 1A is mainly composed of a hollow and cylindrical valve body 17A, and a thermo valve 7 which is stored in the hollow portion of the valve body 17 in a slidable manner, a cap member 18 which is inserted into one end of the valve body 17A, a joint cover 19A which is inserted into the other end of the valve body 17A, and a coil spring serving as a spring member for the thermo valve 7. The thermo valve 7 is mainly composed of an element 10 which is composed of a valve element 12 for communicating and blocking the flow of the cooling fluid and a guide portion 11 for guiding the movement of the element 10, a wax case 15 placed on the bottom of the element 10, a wax 15*a* stored in the wax case 15, a piston 16, and the like.

Parts making up the thermostat 1 will now be described With regard to the parts having the same configurations and the functions as those of the thermostat 1 according to the first embodiment, the detailed explanations thereof will be omitted.

(1) Valve Body 17A:

As shown in FIGS. 4 and 5, in the valve body 17A, an inlet opening 17*a* and an outlet opening 17*b* are formed on the circumference surface 17*e*, and a bypass opening 17*g* is also perforated on the lower portion of the outlet opening 17*b*. A fluid area FA (see FIG. 5) of the cooling fluid channel is formed by the inlet opening 17*a*, the outlet opening 17*b* and the element 10 (valve element 12), and the main channel (fluid channel of the cooling fluid from the radiator side to the engine side) is communicated or blocked. On the other hand, due to the bypass opening 17*g* and the element 10 (valve element 12), the cooling fluid can be circulated within the engine via the bypass channel 3A without being passed through the radiator.

When the element 10 (valve element 12) descends in a slidable manner, the inlet opening 17*a* and the outlet opening 17*b* are opened to communicate the fluid channel area FA, whereby the cooling fluid flows from the radiator side to the engine side. Furthermore, the bypass opening 17*g* is closed to block the cooling channel flowing from the bypass channel 3A to the engine side (see FIG. 4).

On the other hand, when the thermostat 1A ascends in a slidable manner, the inlet opening 17*a* and the outlet opening 17*b* are closed to block the fluid channel area FA, whereby the cooling fluid flowing from the radiator side to the engine side is blocked. In addition, the bypass channel 3A is opened whereby the cooling fluid flows from the bypass channel 3A to the engine side (see FIG. 5).

When the thermostat 1A is fit to an engine head 2A, the valve body 17A is fixed at the position where the inlet opening 17*a*, the outlet opening 17*b*, and the bypass opening 17*g* are opened toward the cooling fluid channel 3 (the position where they are communicated with the cooling fluid channel 3, respectively). Furthermore, the valve body 17A is placed so that the bypass opening 17g is opened to the side of the perforated pore 5a having the stepped wall 5c for the bypass. The open area of the bypass opening 17g is required to be capable of securing a sufficient amount of the cooling fluid flowing within the bypass channel 3A.

Similar to the valve body 17 according to the first embodiment, a screw portion 17d is placed on one end of an inner wall 17c of the valve body 17A so as to be screwed with a screw portion 19f of the joint cover 19A. By screwing the screw portion 17d of the valve body 17A with the screw portion 19f of the joint cover 19A, the set length of the valve body 17A and the joint cover 19A can be adjusted and the valve body 17A and the joint cover 19A can be unified with each other, which makes it easy to place the valve body 17A and the joint cover 19A on the engine head 2A.

In determining the material of the valve body 17A, the environment to be installed, i.e., the thermal conductivity from the engine head 2A and mechanical processability, should be taken into consideration, and any material can be used as long as it adapts to such conditions.

(2) Thermo Valve 7:

Since the thermo valve 7 has the same configuration and the same functions as those of the thermo valve 7 according to the first embodiment, the detailed description will be omitted. The element 10 (valve element 12) opens and closes the inlet opening 17a and the outlet opening 17b as well as the bypass opening 17g.

(3) Cap Member 18:

Since the cap member 18 has the same configuration and the same functions as those of the cap member 18 according to the first embodiment, the detailed description will be omitted.

(4) Joint Cover 19A:

As shown in FIGS. 4 and 5, the joint cover 19A has a flange form and is composed of an insert portion 19 which is inserted into a perforated hole 5a of the engine head 2A, engage portions 19j and 10j which are engaged with the engine head 2A and fixed by bolts 23 and 23, and a bypass channel portion 19h which forms the bypass channel 3A and which is connected to the bypass channel 3A within the engine room.

The insert portion 19k has a hollow and cylindrical form and is inserted into the engine head 2A. The hollow portion makes up the bypass channel 3A. A screw portion 19f to be screwed with a screw portion 17d of the valve body 17A is formed on the insert portion 19k. This screwing unifies the joint cover 19A and the valve body 17A. Furthermore, a groove portion 19a for fastening a seal ring 19b to the outer circumference 19e is formed on the insert portion 19k. The seal ring 19b has a function of preventing the penetration of the cooling fluid from a gap between an inner wall 5b of a perforated pore 5a and a circumference surface 17e of the valve body 17A into the engine block.

The engage portions 19j and 19j regulate the movement of the thermostat 1A, in the slide direction (the direction of moving the piston 16), when the thermostat 1A is fit to the engine head 2A. The engage portions 19j and 19j have a form spreading wings relative to the insert portion 19k. To be specific, the engage portions 19j and 19j are in a plate form whose both ends vertically extend relative to the direction of the movement of the piston 16. In order to fix the thermostat 1A when the thermostat 1A is fit to the engine head 2A, volt pores 19i and 19i are formed on the engage portions 19j and 19j, respectively.

The bypass channel portion 19h, which has a hollow cylindrical form, forms the bypass channel 3A and is connected to the bypass channel 3A (not shown) within the engine room. The bypass channel 3A of the bypass channel portion 19h is communicated with the hollow portion of the valve body 17A. When the element 10 (valve element 12) ascends in a slidable manner, the bypass opening 17g of the valve body 17A is opened to communicate the bypass channel 3A with the bypass opening 17g via the hollow portion of the valve body 17A, whereby the cooling fluid flows from the bypass channel 3A to the engine side and is circulated within the engine. On the other hand, when the element 10 (valve element 12) descends in a slidable manner, the bypass opening 17g of the valve body 17A is closed to block the bypass channel 3A and the bypass opening 17g, whereby the cooling fluid never flows from the bypass channel 3A to the engine side.

By adjusting the conditions of the screwing between the screw portion 17d and the screw portion 19f, the resilient force of the coil spring 6, which is the spring member of the thermo valve 7 can be increased or decreased to adjust the state of opening the valve body 12. This makes it possible to adjust the flow amount of the cooling fluid.

It should be noted that the method of connecting the valve body 17A to the joint cover 19A in the present invention is not restricted to the screwing between the screw portion 17d and the screw portion 19f, and the similar functions and the similar effects can be obtained if fastener such as a C ring is used.

(5) Coil Spring 6 (Spring Member)

Since the coil spring 6 has the same configuration and the same functions as those of the coil spring 6 according to the first embodiment, the detailed description will be omitted.

Next, the fitting of the thermostat 1A to the engine head 2A will be described.

The thermostat 1A is fit to the engine head 2A in the state where the thermostat 1A is unified with the valve body 17A and the joint cover 19A due to the screwing. First, the thermostat 1A is inserted in the engine head 2A at the position where the inlet opening 17a, the outlet opening 17bm and the bypass opening 17g of the valve body 17A are opened toward the cooling fluid channel 3. Furthermore, the thermostat 1A is placed so that the bypass opening 17g is opened to the side of the perforated pore 5a having the stepped wall 5c for the bypass.

At this time, in the thermostat 1A, the engage portions 19j and 19j are engaged with the engine head 2A. This engagement regulates the movement of the thermostat 1A in the slide direction (the direction of moving the piston 16), Furthermore, bolts 23 and 23 are inserted into the bolt pores 19i and 19i of the engage portions 19j and 19j to fix the thermostat 1A to the engine head 2A by means of the bolts. This fixation by the bolts regulates the movement of the thermostat 1A in the radial direction (the rotation direction as the shaft of the piston 16). Unification a of the valve body 17A with the joint cover 19A simplifies the fitting and detaching the thermostat 1 and decreases the man-hour. Furthermore, the inlet opening 17a, the outlet opening 17b, and the bypass opening 17g can easily be aligned by means of the bolt fixation.

As described above, the thermostat 1A is arranged in such a manner that the piston 16 (valve element 12) moves in the direction crossing the fluid channel 3 to the flow direction of the cooling fluid (vertical direction to the flow direction). For this reason, a sufficient flow amount of the cooling fluid can be secured without enlarging the pipe diameter of the cooling fluid channel 3.

Due to the lip portions 18b, 18c, and 18d of the cap member 18, and the seal ring 19b of the joint cover 19, the thermostat 1 possesses the functions of shielding the cooling fluid to the engine and of insulating the vibration.

With reference to FIG. 5, the function of the thermostat 1A will be described, which explains the process for controlling the cooling fluid.

(1) Functions of Thermostat 1A from Closed State to Opened State]

The cooling fluid within the cooling fluid channel 3 before warming up has a low temperature. At this time, the wax 15a within the wax case is in the shrunken state, and a resilient force in the upper direction is always applied to the thermo valve 7 by means of the coil spring 6. For this reason, the valve element 12 of the element 10 closes the inlet opening 17a and the outlet opening 17b of the valve body 17A, and opens the bypass opening 17g. To be specific, the fluid channel area FA is blocked and, thus, the cooling fluid never flows from the radiator side to the engine side. On the other hand, the bypass channel 3A and the bypass opening 17g are communicated with each other via the hollow portion of the valve body 17A, whereby the cooling fluid flows from the bypass channel 3A to the engine side (see FIG. 4).

The temperature of the engine is increased with the elapse of time, and the temperature of the cooling fluid within the cooling fluid channel 3 is also increased. Then, the wax 15a within the wax case 15 swells to increase its volume. At this time, the change in the temperature of cooling fluid flowing from the bypass channel 3A to the bypass opening 17g is directly transmitted to the wax case 15. Due to the increase in the volume of the wax 15a, the diaphragm 15b swells upward. This gives the force of pushing the rubber piston 15d upward via the upper semi-fluid 15c. This force is transmitted to the piston 16 via the backup plate 15e, whereby the piston 16 will project out of the guide portion 11. However, since the contact portion 16a which is the edge of the piston 16 is always in contact with the contact surface 18 of the metal fitting 18a of the cap member 18, which has been fixed, the element 10 itself is pushed down due to the relative movement to the piston 16 (see FIG. 5).

However, since the contact portion 16a which is a tip portion of the piston 16 is always in contact with a contact surface 18a of a metal fitting 18, the guide portion 11 and the element 10 (valve element 12) actually descend.

At this time, the circular groove 14a of the guide portion 11 which is engaged with the lip portion 18e of the cap member 18 (see FIG. 4) descends along the inner wall surface 18h of the cap member 18 and is finally engaged with the lip portion 18f of the cap member 18 (see FIG. 5). The position of the lip portion 18f formed by the projection is an approximate position for determining the final descending position of the element 10. On the way from the lip portion 18e to the lip portion 18f, another lip portion may be formed to enhance preventing the cooling fluid from penetrating into the gap portion between the guide portion 11 and the piston 16, The coil spring 6 for the purpose of always applying the resilient force to the thermo valve 7 upwardly is placed on the gap between the thermo valve 7 and the joint cover 19A and, thus, the thermo valve 7 descends in a slidable manner against the resilient force of the coil spring 6.

When the thermo valve 7 descends, the inlet opening 17a and the outlet opening 17b of the valve body 17A, which have been in the closed state, are opened by the valve element 12 of the element 12 to be communicated with the fluid channel area FA. As a result, the cooling fluid flows from the radiator side to the engine side (see the belt arrow of FIG. 2). Then, the cooling fluid, which has been cooled in the radiator, passes through the cooling fluid channel 3 and flows into the engine. At this time, since the change in the temperature of the cooling fluid is transmitted via the element 10 of the valve element 12 to the wax case 15, which is a temperature sensitive portion, the cooling fluid, which has cooled in the radiator side, never suddenly shrinks the wax 15a.

Also, when the thermo valve 7 descends, the valve element 12 of the element 10 closes the bypass opening 17g of the valve body 17A, which is in an opened state. To be specific, the bypass channel 3A and the bypass opening 17g are blocked, and the cooling fluid never flows to the engine side via the bypass channel 3A (see FIG. 5).

(2) Functions of Thermostat 1A from Opened State to Closed State

When the engine is stopped, the actuation of the water pump is also stopped and the circulation of the cooling fluid within the cooling fluid channel 3 is stopped as well The temperature of the cooling fluid within the cooling fluid channel 3 is decreased with the elapse of time. According to the temperature change, the wax 15a, which has been expanded, is shrunken. Since the change in the temperature of the cooling fluid flowing from the radiator side is transmitted to the wax case 15, which is a temperature sensitive portion, via the valve element 12 of the element 10, the wax 15a is mildly shrunken. This causes the thermo valve 7 to slide upward by means of the resilient force of the coil spring 6 which always applies the upward resilient force to the thermo valve 7, As a result, the valve portion 12 of the element 10 closes the inlet opening 17a and the outlet opening 17b of the valve body 17A, which have been opened, and opens the bypass opening 17g. To be specific, the fluid channel area FA is blocked, and the cooling fluid does not flow from the bypass channel 3A to the engine side, Consequently, the cooling fluid is circulated within the engine without passing through the radiator (see FIG. 4).

Since the temperature change of the cooling fluid is transmitted via the element 10 of the valve element 12 to the wax case 15, which is a temperature sensitive portion, the volume change in the wax 15a becomes milder. As a result, it becomes difficult to cause the hunting phenomenon where the valve element 12 repeatedly opens and closes the inlet opening 17a, the outlet opening 17b, and the bypass opening 17g.

It should be understood that the present invention is not restricted to the above embodiments, and is carried out in various embodiments For example, the valve body and the joint cover are unified in the above embodiments, but they may be separated.

Also, the thermostat may be placed within the cooling fluid channel of the engine head in the above embodiments, but it may be placed in any appropriate portion of the cooling fluid channel.

According to the flow control process for controlling a cooling fluid as described in claim 1, since the valve element is moved forward or backward in the manner of crossing the cooling fluid channel, the flow amount of the cooling fluid can be secured without changing the pipe diameter of the cooling fluid channel and the device can be fie to a voluntary portion of the cooling fluid channel According to the flow controller for controlling a cooling fluid as described in claim 2, since the flow controller is configured so as to cross the fluid channel area, the controller can be placed within a voluntary portion of the cooling fluid channel. In addition, an adequate flow amount of the cooling fluid can be secured without changing the pipe diameter.

According to the flow controller for controlling a cooling fluid as described in claim 3, since the temperature change of the cooling fluid is transmitted to the thermo-sensitive portion via the valve element, the thermal expanding element within the thermo-sensitive portion responds to the temperature change of the cooling fluid in a mild manner which prevents the hunting phenomenon, and thus, the flow amount of the cooling fluid can be controlled in a stable manner. As a result, the temperature of the engine can be maintained at an appropriate temperature, improving the fuel efficiency and decreasing the discharge of the harmful exhaust gas. Furthermore, the durability of the flow controller for controlling a cooling fluid is also enhanced.

According to the flow controller for controlling a cooling fluid as described in claim 4, since the valve body and the joint cover are unified with each other, the fitting and detaching the thermostat is simplified and the man-hour is decreased. Also, the alignment of the flow controller for controlling a cooling fluid is simplified.

According to the flow controller for controlling a cooling fluid as described in claim 5, due to the forward or backward movement of the valve element, the main channel of the cooling fluid channel is communicated or blocked, and the bypass opening and a bypass channel are communicated or blocked. For this reason, the flow control via the bypass channel can be carried out with a very simple manner,

What is claimed is:

1. A flow controller which is placed within a cooling fluid channel of an internal combustion engine and which is configured to control a flow of a cooling fluid flowing through the cooling fluid channel depending upon the temperature change of the cooling fluid, comprising:

a cylindrical valve body which has an inlet opening and an outlet opening formed on a circumference of the valve body and which is fixed on a position where said inlet opening and said outlet opening are communicated with said cooling fluid channel;

a fluid channel area which communicates said inlet opening and said outlet opening within said valve body; and a valve element which is configured to move forward and backward in the manner of crossing said channel area depending upon the temperature change of said cooling fluid, whereby said inlet opening and said outlet opening are opened or closed through the movement of said valve element to communicate or block said fluid channel area, wherein a bypass opening is formed on the circumference of said valve body, and said bypass opening and a bypass channel are communicated or blocked due to the movement of the valve element.

2. The flow controller of the cooling fluid as claimed in claim 1, wherein said valve element is configured to move forward or backward due to the expansion/shrinkage of a thermal expanding element, and the temperature change of the cooling fluid is transmitted to said thermo-sensitive portion via the valve element.

3. The flow controller of the cooling fluid as claimed in claim 1, wherein a joint cover configured to fix said valve body is unified with said valve body.

4. The flow controller of the cooling fluid as claimed in claim 2, wherein a joint cover configured to fix said valve body is unified with said valve body.

5. A flow control process for controlling a flow of a cooling fluid flowing through a cooling fluid channel of an internal combustion engine, the process comprising:

detecting a temperature of the cooling fluid with a temperature detection portion which is provided in a valve element;

moving the valve element slidably on an inner surface of a valve body into which the valve element is inserted in order to open and close an inlet opening and an outlet opening provided on the inner surface of the valve body according to the temperature of the cooling fluid detected by the temperature detection portion, the inlet opening and the outlet opening being provided in the cooling fluid channel.

6. A flow controller which is configured to be placed within a cooling fluid channel of an internal combustion engine and which is configured to control a flow of a cooling fluid flowing, through the cooling fluid channel depending upon a temperature of the cooling fluid, comprising:

a cylindrical valve body which has an inlet opening and an outlet opening formed on an inner circumferential surface of the valve body and which is configured to be provided such that said inlet opening and said outlet opening are communicated with said cooling fluid channel;

a fluid channel area provided in the valve body to communicate said inlet opening and said outlet opening; and a valve element provided in the valve body and configured to move slidably on the inner surface of the valve body in order to open and close the inlet opening and the outlet opening according to the temperature of the cooling fluid.

7. The flow controller of the cooling fluid as claimed in claim 6, wherein said valve element moves forward or backward due to the expansion/shrinkage of a thermo-sensitive portion, and the temperature of the cooling fluid is transmitted to said thermo-sensitive portion via the valve element.

8. The flow controller of the cooling fluid as claimed in claim 6, wherein a joint cover configured to fix said valve body is unified with said valve body.

9. The flow controller of the cooling fluid as claimed in claim 7, wherein a joint cover configured to fix said valve body is unified with said valve body.

10. The flow controller of the cooling fluid as claimed in claim 6, wherein a bypass opening is formed on the inner circumferential surface of said valve body, and said bypass opening and a bypass channel are communicated or blocked due to a movement of the valve element.

11. The flow controller of the cooling fluid as claimed in claim 7, wherein a bypass opening is formed on the inner circumferential surface of said valve body, and said bypass opening and a bypass channel are communicated or blocked due to a movement of the valve element.

12. The flow controller of the cooling fluid as claimed in claim 8, wherein a bypass opening is formed on the inner circumferential surface of said valve body, and said bypass opening and a bypass channel are communicated or blocked due to a movement of the valve element.

13. The flow controller of the cooling fluid as claimed in claim 9, wherein a bypass opening is formed on the inner circumferential surface of said valve body, and said bypass opening and a bypass channel are communicated or blocked due to a movement of the valve element.

* * * * *

UNITED STATES PATENT AND TRADEMARK OFFICE
CERTIFICATE OF CORRECTION

PATENT NO.     : 6,386,150 B1
DATED          : May 14, 2002
INVENTOR(S)    : Iwaki It is certified that error appears in the above-identified patent and that said Letters Patent is hereby corrected as shown below:

<u>Title page,</u>
Item [30], Foreign Application Priority Data has been omitted. Item [30] should read:

-- [30]       Foreign Application Priority Data

Jan. 27, 1999    (JP) ………………………..11-017913 --

Signed and Sealed this

Twenty-fifth Day of February, 2003

JAMES E. ROGAN
*Director of the United States Patent and Trademark Office*